| United States Patent [19] | [11] | 4,451,416 |
|---|---|---|
| Burtscher | [45] | May 29, 1984 |

[54] METHOD OF PRODUCING A COMPOSITE FOAMED RESIN TORSO AND HEAD SECTION OF A HUMAN SUMMARY FOR MEDICAL TRAINING PURPOSES

[75] Inventor: Paul Burtscher, Dübendorf, Switzerland

[73] Assignee: Zurcher Kantonalbank, Zurich, Switzerland

[21] Appl. No.: 291,591

[22] Filed: Aug. 10, 1981

[30] Foreign Application Priority Data

Aug. 13, 1980 [CH] Switzerland .......................... 6119/80

[51] Int. Cl.³ .............................................. B29D 27/04
[52] U.S. Cl. .................................. 264/46.6; 264/46.9; 264/225; 434/274
[58] Field of Search ...................... 264/46.6, 225, 46.9; 434/274

[56] References Cited

U.S. PATENT DOCUMENTS

| 1,902,627 | 3/1933 | Elbogen | 264/225 X |
| 3,222,443 | 12/1965 | Dames, Jr. et al. | 264/225 X |
| 3,895,451 | 7/1975 | Smrcka | 434/274 |
| 3,946,095 | 3/1976 | Dziulak | 264/46.6 X |
| 4,106,219 | 8/1978 | Schneider et al. | 434/274 |

Primary Examiner—Philip E. Anderson
Attorney, Agent, or Firm—Ladas & Parry

[57] ABSTRACT

A flowable slidifyable mass is applied onto the inner surface of a hull made of an elastomeric material and corresponding to the human skin section. This flowable mass is let to solidify into a shell-like body. Thereafter the shell-like body is cut and machined such to produce an article corresponding in shape to a portion of the human skeleton. A molding mass which solidifies to a flexible body is injected into the void space defined by the elastomeric hull stretched over the skeleton portion such that a flexible negative form of the skeleton is produced. Thereafter the elastomeric hull, the negative form and the skeleton portion are separated from each other and the elastomeric hull stretched over the negative form only and a further molding mass is inserted into the void spaces defined by the elastomeric hull and the negative form such that an arbitrary number of skeleton portions can be produced. The elastomeric hull is thereafter stretched over the skeleton portion and the void space defined thereby filled by a foamed material whereby casting cores are provided which produce within the foamed material void spaces intended to protectively receive apparatuses associated with the medical training purposes. Foamed bodies produced accordingly are arranged within respective skeleton portions and elastomeric hulls stretched thereover such that a true to nature human dummy is produced, in which human dummy any apparatuses associated with the medical training purposes can be securely protectively supported.

10 Claims, 13 Drawing Figures

METHOD OF PRODUCING A COMPOSITE FOAMED RESIN TORSO AND HEAD SECTION OF A HUMAN SUMMARY FOR MEDICAL TRAINING PURPOSES

BACKGROUND OF THE INVENTION

1. Field of the Invention

This invention relates to a method of producing the torso and head section of a human dummy intended for medical training purposes. It relates further to a casting mold device for casting the torso and head section of a human dummy intended for medical training purposes. The invention relates further to a torso and head section of a human dummy intended for medical training purposes.

Human dummies used for medical training purposes should feature a realistic natural characteristic for providing a true to life appearance of a human body. Furthermore, this requires that such dummies carry out true to life reactions, for instance that they show reactions stemming from first-aid measures carried out thereon. Such human dummies, furthermore, are provided with apparatuses relating to the medical training purposes, which apparatuses are located within the dummies. These apparatuses are for instance electronic control devices or mechanical pumps, such as e.g. to simulate the human pulse. These apparatuses and devices are rather expensive products and accordingly they must be protected against damage which may occur e.g. by a wrong or careless handling of the dummy or due to wrongly carried out measures.

2. Description of the Prior Art

Human dummies intended for the use for medical training purposes, which are at least artifically made parts of human bodies, are generally known. There exist e.g. artificially made human heads, which are used for exercising so-called mouth to mouth or mouth to nose breathing. The known dummies or dummy sections, respectively, feature on the one hand the drawback that they do not have a true to life appearance and on the other hand that they are easily prone to injury and damage due to false handling thereof not only during the training proper but also during the transport from one location to the other.

Known rather complete dummies feature further drawbacks. They comprise a skeleton including the vertebral column, the sternum and ribs which all are mechanical articles screwed and bolted together. Experience has shown, however that the single elements or articles suffer damage after prolonged use or that the mechanical elements holding them together (screw bolts, etc.) loosen such that elements get separated from each other. In such case the hull-like skin stretched over the skeleton as well as the foamed material located within the dummy will be destroyed due to dislocated skeleton elements. Further disadvantage of these known dummies is a rather high mechanical expense of the construction which renders such dummies rather expensive. Furthermore, because the various parts of the simulated skeleton such as the vertebral column, the pelvis section, the shoulder section, etc. mechanically held together have rather large space requirements, the dummy lacks inner space for receiving relatively large batteries, energizers, mechanical apparatuses for simulating reactions, etc.

SUMMARY OF THE INVENTION

Hence, it is a general object of the present invention to provide an improved method of producing the torso and head section of a human dummy intended for medical training purposes which allows a production of human dummies less prone to damage and protectively receiving any apparatuses relating to the medical training purposes.

Another object of this invention aims at the provision of a torso and head section of a human dummy intended for medical training purposes which is simple in construction and design, reliable in operation, economical to manufacture and dependable in use. A further object of the invention is a method of producing the torso and head section of a human dummy intended for medical training purposes which comprises the steps of providing a skin-shaped hull made of an elastomeric material and corresponding to the human skin section covering the torso and head of a human body; of applying a flowable, solidifyable mass onto the inner surface of said skin-shaped elastomeric hull and letting said mass solidify to a rigid shell-like body; of removing said elastomeric hull from said solidified shell-like body; of cutting and machining said shell-like body to a shape corresponding at least to the projection of the torso and skull section of a human skeleton so as to shape a master model thereof; of inserting said master model into said elastomeric skin-like hull and of injecting a molding mass into the inner void space defined by said elastomeric skin-like hull stretched over said master model and of letting said molding mass solidify to a negative mold form of said master model; of removing said master model from said negative mold form; of casting a solidifying mass into the void space defined by said negative mold form and said elastomeric hull stretched thereover and letting said mass solidify to a final skeleton section; of removing said negative mold form from said final skeleton section and said elastomeric hull remaining stretched thereover; and of arranging a foamed material into the inner void space defined by said elastomeric hull stretched over said final skeleton section which foamed material is provided with void spaces intended to protectively receive and surround apparatuses associated with said medical training purposes.

A further object of the invention aims at the provision of a casting mold device for casting the torso and head section of a human dummy intended for medical training purposes which comprises a block-like core having a surface structure corresponding to the negative shape of the skeleton portion to be cast; a skin-like elastomeric hull having a surface structure corresponding to the surface structure of the skin of a human head and torso which said elastomeric hull is stretched over said block-like core; and a bipartite casting box in which said block-like core and said elastomeric hull stretched thereover are received, which casting box is provided with a casting space having an inner surface structure corresponding to the structure of the outer surface of said elastomeric hull.

Yet a further object of the invention aims at the provision of a torso and head section of a human dummy intended for medical training purposes which comprises a skeleton section made of a rigid plastic material and shaped at least in accordance with the projection of the corresponding portion of the human skeleton encompassing the skull and torso; a laminar elastomeric hull having an outer surface structure corresponding to the outer surface structure of the human skin of the head and torso of a human body, which elastomeric hull is stretched over said skeleton section; and an insert manufactured from a foamed material filling the space defined by said elastomeric body and said skeleton portion which insert is provided with at least one void space intended to protectively receive apparatuses associated with said medical training purposes.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
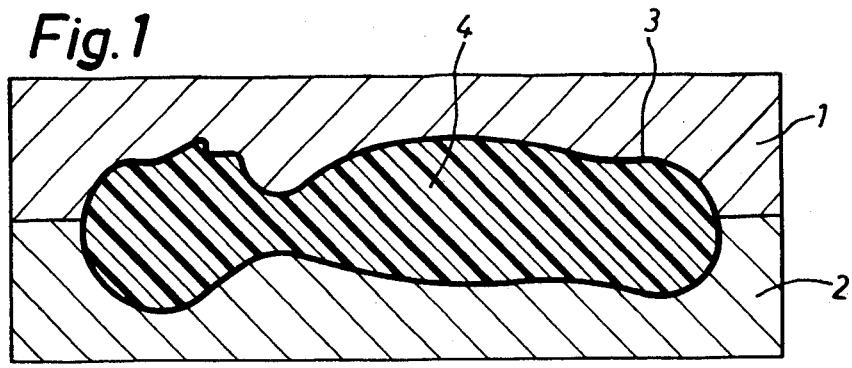
FIG. 1 is a sectional view of a molding box, in which an elastomeric hull is stretched over a supporting core.

Describing now the drawings, and considering initially the exemplary preferred embodiment as shown in FIG. 1 it will be understood that there is depicted schematically a sheet- or skin-, respectively, like hull of an elastomeric material identified by the reference numeral 3 which elastomeric hull 3 is shaped in accordance with the human skin covering the head and torso portion of a human body.

The production of this elastomeric hull forms no part of the present invention. There are various known procedures of producing such elastomeric hull representing the human skin, i.e. having its outer surface structured in accordance with the skin of a human body. Such elastomeric hull can be e.g. be made from a silicone caoutchouc material. A known method of producing such skin-like hull is to apply a resin onto a (living) human body and letting the resin set. Then such resin in the form of the commonly known cast is cut along a dividing line such that two shells are obtained and removed from the body portion, e.g. an arm of the living body. The inner surface of such two half shells carries now obviously exactly the structure of the human skin onto which it has been applied to. Thereafter the two half shells are brought again together and a casting core inserted therein such to leave a space of e.g. one sixteenth of an inch between the inner surface of the shells and the outer surface of the casting core. Into the interstice between the shell and the core a flowable material setting to a flexible article is injected. Such material may be e.g. again silicone caoutchouc. After the setting of the silicone caoutchouc the two half shells are separated again and the silicone caoutchouc peeled off the casting core such that an elastomeric hull corresponding at its outer surface structure to the skin of the human body portion around which the resin originally has been molded is obtained.

Regarding this description it is very important to know, that as mentioned above the outer surface of the elastomeric hull 3 has a structure which corresponds to the structure of the human skin and that it is a stretchable, flexible material with a relatively small wall thickness.

Reference is made now again to FIG. 1. If the elastomeric hull 3 is stretched over a support core 4 which support core 4 is intended to support the flexible or floppy, respectively, hull 3 such that this elastomeric hull 3 is generally contoured exactly as the human skin covering head and torso of the body, quite obviously this support core 4 can be exactly such casting core which has been used for the original production of the elastomeric hull 3 as outlined above. This support core 4 accordingly supports the elastomeric hull 3 in a stretched condition. The support core 4 and the elastomeric hull 3 stretched thereover is inserted or located respectively in a molding or casting box consisting of an upper half 1 and a lower half 2. Again it must be mentioned, that this molding or casting, respectively, box may be one used for the original production of the elastomeric hull 3 as outlined above. It is important that the structure of the inner surfaces of the molding box halves 1 and 2 are such that the outer surface of the elastomeric hull abuts exactly without any voids the inner surfaces of the molding box halves 1 and 2 and is accordingly supported therefrom.

For the sake of good order it shall be mentioned again that the molding box halves 1 and 2 as well as the support core 4 may be articles which are used for the original production of the elastomeric hull 3 according to a known production method.

Figure 2:
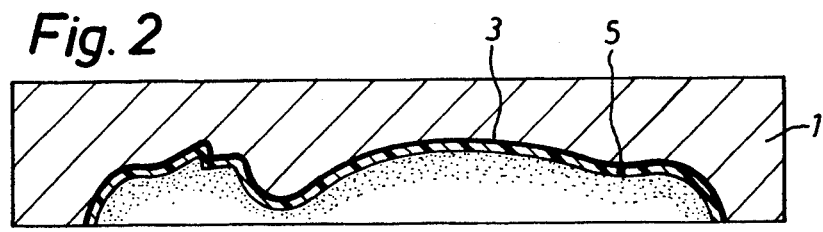
FIG. 2 is a sectional view of the molding box of FIG. 1 shown in a separated condition whereby a rigidly solidified mass is applied onto the elastomeric hull.

Attention is now drawn to FIG. 2. The elastomeric hull 3 which is originally a one piece integral article is cut along the dividing line of the molding box 1, 2 into two parts. Because the elastomeric hull 3 is tightly held between on the one hand the support core 4 and on the other hand the molding box halves 1 and 2 such cutting in two can obviously be carried out without any difficulty. In the particular embodiment shown the elastomeric hull 3 is arranged in a "lying" position regarding the human body and is cut in a horizontally extending plane. It is obviously possible in accordance with further embodiments to cut the elastomeric hull 3 in its plane of symmetry, i.e. with reference to the drawings in a plane extending perpendicularly to the plane of the drawings.

Figure 3:
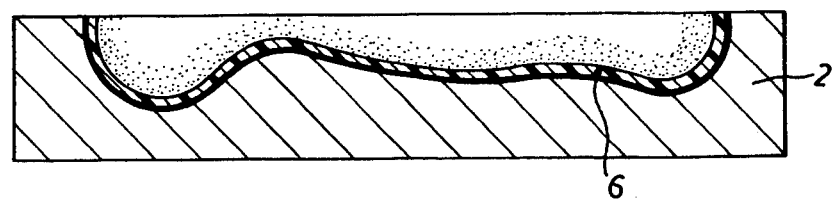
FIG. 3 is a sectional view of a shell-like body.

After the elastomeric hull 3 has been cut in two as shown in FIG. 2 the two molding box halves 1, 2 are separated from each other. Furthermore, the support core 4 is removed. Accordingly, the two parts of the cut elastomerical hull 3 lie on the molding surfaces of the molding box halves 1, 2. Then, a flowable solidifyable layer, e.g. an epoxy resin, is applied on the respective inner surfaces of the two elastomeric hull halves. After the hardening or setting, respectively, of this applied resin two half shells 5, 6 are obtained such as shown in FIG. 2. These two half shells 5, 6 are thereafter connected to each other such that a single complete shell 5,6 is obtained such as shown in FIG. 3 which single shell 5,6 features an outer surface structure which corresponds to or is equal to, respectively, the structure of the inner surface of the elastomeric hull 3. The connecting of the two half shells 5,6 to each other may be carried out outside of the molding box halves 1,2. In order to obtain a good centering it is obviously also possible to leave the two half shells 5,6 inside the molding box halves 1,2 in the arrangement as shown in FIG. 2 and to connect the two half shells 5 and 6 remaining in the molding box halves 1,2.

Figure 4:
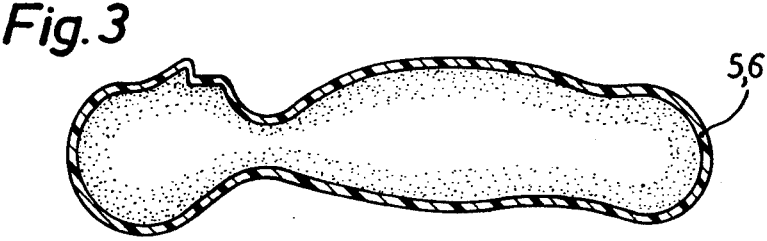
FIG. 4 is a sectional view through a master model.

Attention is now drawn to FIG. 4. The complete integral shell 5,6 is now worked on, i.e. cut, machined such that a portion resembling a human skeleton of the skull and torso (ribs, sternum, vertebral column, etc.) is produced. It must be noted here, that it is basically only necessary that the skeleton section 7 produced from the shell 5,6 resembles the projection of a human skeleton onto the shell 5,6. This skeleton section 7 is shown in FIG. 4 schematically, i.e. a section of the skeleton 7 is shown schematically. This skeleton section 7 forms now the master model for the following production steps.

Figure 5:
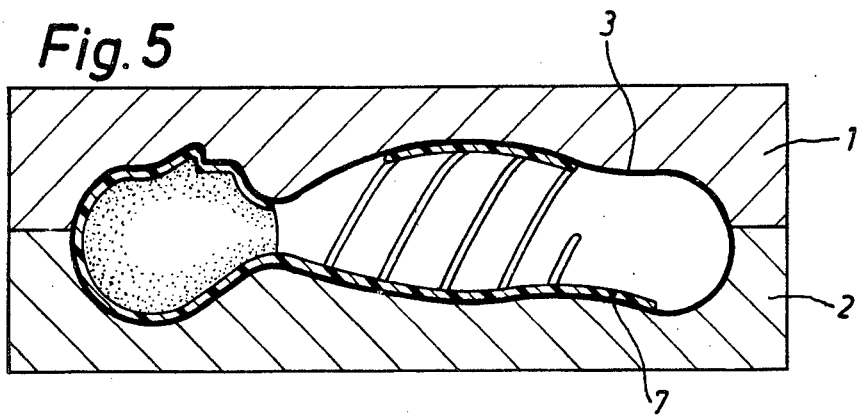
FIG. 5 is a sectional view of the master model of FIG. 4 inserted again in the molding box.
Figure 7:
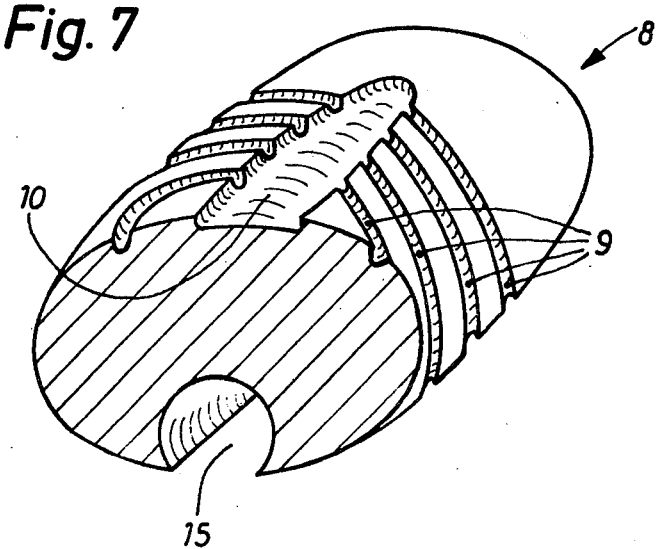
FIG. 7 is a perspective view of a portion of a negative form.

Attention is drawn to FIG. 5. An elastomeric hull 3 is again stretched over the skeleton section 7, i.e. over the master model. Thereafter this master model, the skeleton section 7 including the elastomeric hull 3 stretched thereover is again inserted into the molding box halves 1,2. Thereafter the inner void space of the elastomeric hull 3 draped over the master model 7 is filled by a mass setting to a flexible body. Such mass may be e.g. a silicone caoutchouc, i.e. it may be the same material which has been used for the original production of the elastomeric hull 3. This set silicone caoutchouc has the shape of a negative form shown in FIG. 7 and identified by the reference numeral 8. FIG. 7 shows only a portion of this negative form 8. Thereby the block- or body-like silicone caoutchouc part comprises recesses or channels, respectively, corresponding as shown to the sternum 10, the ribs 11 and the vertebral column 15 of the human skeleton, said channels defining the negative form of the various portions of the skeleton. In order to facilitate the so-called opening of the mold this casting core, i.e. the negative model 8, may be made in a plurality of sections.

Figure 8:
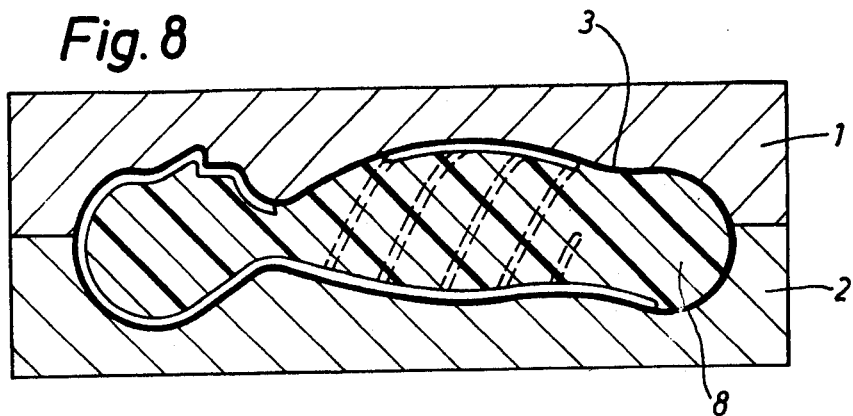
FIG. 8 is a sectional view showing the negative form re-inserted in the molding box.

Attention is drawn now to FIG. 8. An elastomeric hull 3 is again stretched over this negative form 8 and both inserted again into the molding box halves 1 and 2. Accordingly, a casting or molding form having a core is present such that an arbitrary number of skeleton portions can be cast in a known way. Obviously now the shape of the cast skeleton portions are identical to the shape of the master model 7 drawn in FIG. 4.

Figure 9:
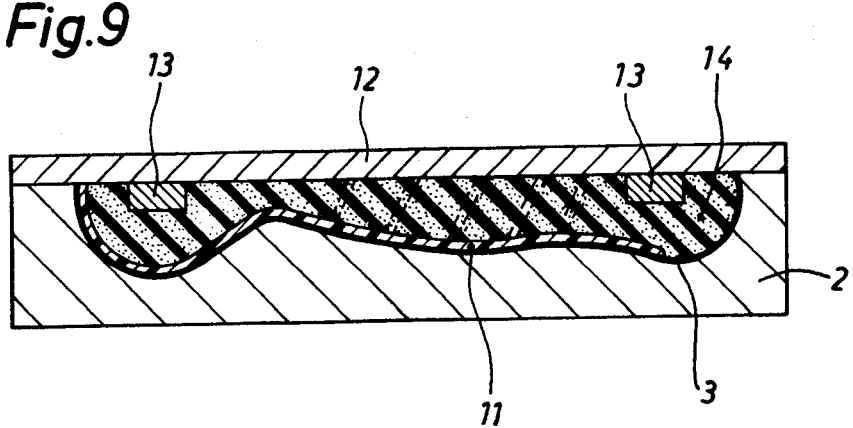
FIG. 9 is a foamed part of the dummy located in the molding box half.

The next production or method step which is directed to the production of a means for protective supporting of the earlier mentioned apparatuses, control devices within the human dummy is shown in FIG. 9.

To this end one-half of an elastomeric hull 3 is inserted again into a molding box half 2. A half of a skeleton portion is also inserted into the molding box half 2 such to lie on top of the skeleton section 7. Furthermore, there is provided a top cover 12 having one or several cores of casting 13. This top cover 12 including the cores of casting 13 is arranged upon the lower molding box half 2. Thereafter the remaining void space is foamed by any kind of known material such that a body 14 of foamed material, e.g. aerated plastic material is achieved. This foaming material may be a so-called integral foam with a skin producing effect. By the agency of the cores 13 an arbitrary number of void spaces of arbitrary forms are produced having shapes and dimensions which obviously correspond to the shapes and dimensions of the apparatuses, control mechanisms, etc. to be inserted into the human dummy. The second, upper half of the foamed material body 14 can be produced in the same way or without any cores 13 if sufficient space can be made available in the lower half.

In order to finally produce the dummy one of the produced foamed material bodies 14 is inserted into a skeleton portion (see e.g. FIG. 4) and thereafter the elastomeric hull 3 corresponding to the human skin is stretched over the skull section including the foamed body.

Due to the exemplary arrangement shown in FIG. 1 it is possible to cast an arbitrary number of elastomeric hulls 3. Due to the arrangement shown in FIG. 8 it is possible to cast an arbitrary number of skeleton sections and finally the arrangement in accordance with FIG. 9 allows the casting of an arbitrary number of foamed bodies 14. It can be seen from the proceeding explanations that the articles produced in series such as e.g. the elastomeric hull 3 as well as the skeleton section 7 can be used again as mold portions in order to carry out any of the immediately following method steps.

In FIGS. 10–13 a further embodiment is shown. Quite obviously the skeleton section produced in accordance with the afore mentioned embodiment is a rigid article. This may be satisfactory for a number of applications. However, it may be for certain training purposes or first-aid exercises, respectively, necessary to train a correct positioning of an injured person, to exercise e.g. the artifical breathing of an injured person by the well known technique of blowing air through the nose of this injured person. This leads now to the fact that the head portion of the human dummy must be able to be rotated and pivoted relative to the vertebral column and also that the vertebral column itself can be flexed in accordance with the possible corresponding movements of a natural human person.

These movements can in accordance with this embodiment be achieved by the use of a flexible metal hose 75 also known under the name goose neck which is a widely known article.

Figure 10:
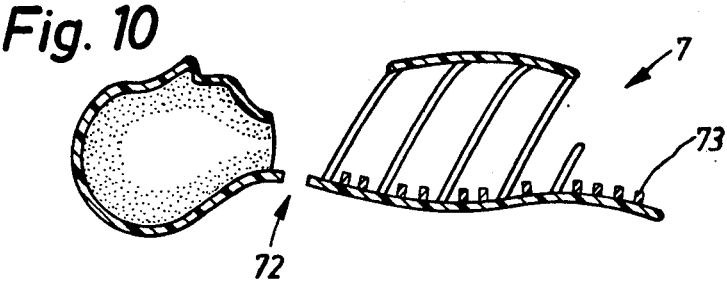
FIG. 10 is a sectional view showing a production step of a further embodiment whereby the master model of FIG. 4 is subject to a further manufacturing step.

As shown in FIG. 10 the skull portion of the original model (see FIG. 4) is separated from the rest of the skeleton portion such as shown in FIG. 10. Thereafter disk-like bodies 73 of a design as shown in FIG. 13 are slipped onto the vertebral column.

Figure 6:
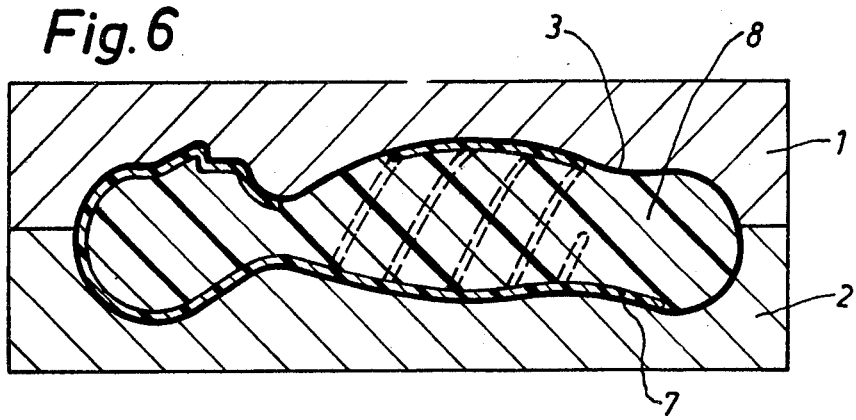
FIG. 6 is a sectional view showing the production step of the negative form.

Again, the elastomeric hull 3 is stretched over the master model present now in two parts and comprising a number of disk-like bodies 73, and this combination is again inserted into the molding box 1,2 such as described with reference to the first embodiment corresponding to the production step as shown in FIG. 6.

Figure 11:
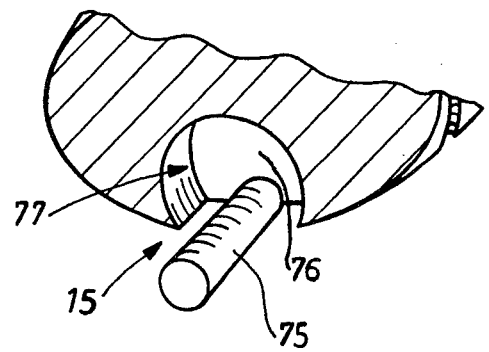
FIG. 11 is a perspective view of a part of the master model produced in accordance with FIG. 10.
Figure 12:
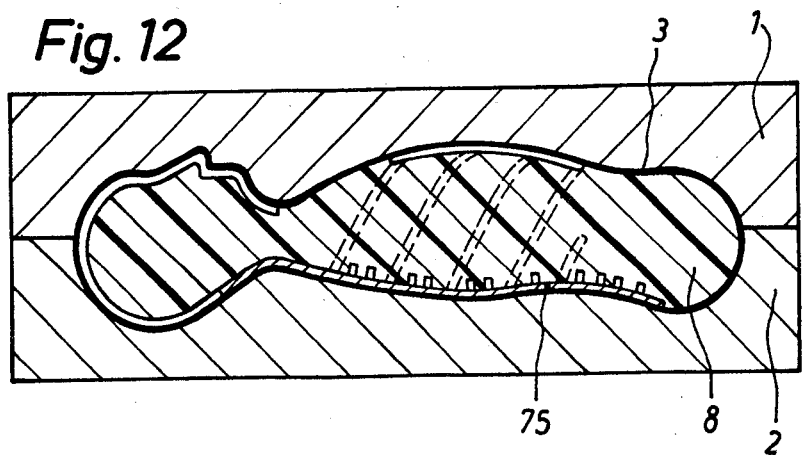
FIG. 12 is a sectional view of the master model of FIG. 11 inserted into the molding box and provided with the flexible tube.

The negative form of a flexible material cast as mentioned earlier is shown in part in FIG. 11. Due to the disk-like bodies 73 this negative form as shown in FIG. 11 differs from such shown in FIG. 7 in that the vertebral column 15 section of the form contains a number of subsequent spaces 77 divided from each other by a lateral partition wall 76. This partition wall 76 is of course an integral part of the negative form and the spaces are obtained due to the presence of the now removed disk-like bodies 73. Thereafter a flexible metal hose 75 is inserted such that it is set into the lateral partition wall 76 which flexible metal hose 75 extends until into the skull portion. Thereafter the negative form is inserted again into a molding box 1,2 together with the elastomeric hull 3 such as shown in FIG. 12, which FIG. 12 corresponds basically to FIG. 8 of the first embodiment. If now a molding mass is cast around the negative form in the molding box 1,2, distinct separate elements are molded at the vertebral column section which separate elements correspond to the spinal vertebra of the human skeleton which now are held together only by the flexible metal hose 75. The same form of connection exists obviously between skull and vertebral column such that the skull is movable relative to the vertebral column and the vertebral column sectioned now as described is also movable and accordingly a natural moving capacity of this skeleton portion is achieved.

Figure 13:
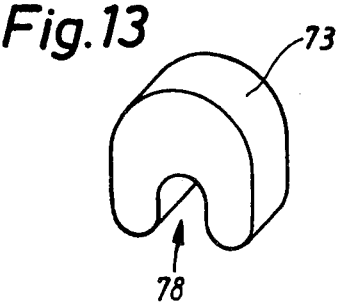
FIG. 13 is a disk intended to be slipped into the master model.

The disk-like bodies 73 used to achieve above are shown in FIG. 13. They are provided with a recess 78 which recess 78 is arranged such that the disks 73 can be set upon the vertebral column section of the original model. Preferably and obviously these disk-like bodies 73 will be arranged at such locations along the vertebral column which correspond to the disks of the human body located between two adjoining dorsal vertebrae.

While there are shown and described present preferred embodiments of the invention, it is to be distinctly understood that the invention is not limited thereto, but may be otherwise variously embodied and practiced within the scope of the following claims. Accordingly,

What is claimed is:

1. A method of producing the torso and head section of a human dummy intended for medical training purposes, comprising the steps of:

providing a skin-shaped hull made of an elastomeric material and corresponding to the human skin section covering the torso and head of a human body;

applying a rigidly setting pourable compound on to the inner surface of said skin-shaped elastomeric hull and permitting said rigidly setting compound to solidify to a rigid shell-like body;

removing said elastomeric hull from said soldified shell-like body;

forming a master model by cutting and machining said shell-like body so as to produce a model of the torso and skull sections of a human skeleton in which at least surface areas extending laterally to outer and inner surfaces of said rigid shell-like body have a contour which is similar to a contour of corresponding natural bone sections of said human skeleton, so that said master model has a form of at least the projection of the torso and skull sections of a human skeleton;

inserting said master model into said elastomeric skin-like hull, said master model keeping said skin-like hull in a spread open state such that it defines a void, injecting an elastomerically setting pourable compound into said void defined by said elastomeric skin-like hull stretched over said master model and of letting said elastomerically setting compound solidify to an elastomerically yielding negative mold form of said master model;

removing said master model from said elastomerically yielding negative mold form;

inserting said negative mold form into said elastomeric hull to define a void space between said negative mold form and said elastomeric hull;

casting a rigidly setting pourable compound into the void space defined by said negative mold form and said elastomeric hull;

permitting said rigidly setting compound to solidify to a final skeleton section;

removing said negative mold form from said final skeleton section, said elastomeric hull remaining stretched thereover; and locating casting cores in an innder void space defined by said elastomeric hull stretched over said final skeleton section;

injecting a foamed material into said inner void space,; and permitting said foamed material to set whereby said inner void space is provided with voids for protectively receiving and surrounding apparatuses associated with said medical training purposes.

2. The method of claim 1, wherein applying said rigidly setting pourable compound comprises the steps of:

providing a bipartite molding box having an inner surface structure corresponding to the structure of the outer surface of said skin-shaped elastomeric hull;

separating said skin-shaped elastomeric hull into two halves along a first partition line corresponding to the two halves of said molding box and of inserting the corresponding halves of said elastomeric hull into the respective molding box halves;

applying said flowable, solidifying mass onto the inner surface of each of said elastomeric hull halves and letting said mass solidify to two rigid shell halves; and joining said two rigid shell havles together along a second partition line corresponding to said first partition line in order to form said rigid shell-like body.

3. The method of claim 2, wherein the separating of said skin-shaped elastomeric hull into two halves comprises the steps of providing a support core and stretching said elastomeric hull over said support core such that said elastomeric hull is supported in a true to life shape;

inserting said support core covered by said elastomeric hull into a split molding box consisting of said two molding box halves joined together; and cutting said elastomeric hull along the parting line of said split molding box in two parts.

4. The method of claim 2, where the step of separating said skin-shaped elastomeric hull is performed along its plane of symmetry.

5. The method of claim 1, wherein the injecting of said elastomerically setting pourable compound into said void defined by said elastomeric hull stretched over said master model comprises the step of arranging said master model and said elastomeric hull stretched thereover into a mold box having a molding cavity with an inner surface corresponding in structure to the outer surface of said elastomeric hull.

6. The method of claim 1, wherein the casting of said rigidly setting compound into said void space defined by said negative mold form and said elastomeric hull stretched thereover and letting said rigidly setting compound solidify to said final skeleton section comprises arranging said negative mold form and said elastomeric hull stretched thereover into a mold box including a molding cavity having an inner surface corresponding in structure the outer surface of said elastomeric hull.

7. The method of claim 1, wherein the locating of said casting cores within said inner void space defined by said elastomeric hull stretched over said final skeleton section comprises the steps of providing an identical further said final skeleton section and an identical further said elastomeric hull stretched thereover and arranging both in a two box part bipartite molding box having an inner surface structure corresponding to the surface structure of the outer surface of said elastomeric hull;

cutting in two said further final skeleton section and said further elastomeric hull stretched thereover along the partition line of said bipartite molding box;

providing a top cover including at least one casting core for at least one molding box part and arranging such on top of said molding box part;

foaming each of said molding box parts in order to provide a body of foamed material; and inserting said body of foamed material into the first-named said final skeleton section having said first-named elastomeric body stretched thereover.

8. The method of claim 1, comprising the step of slipping a plurality of disk-like bodies each including a radially extending recess on to the portion of said master model which corresponds to a vertebral column.

9. The method of claim 8, comprising the steps of inserting an elongated flexible body into a molding section of said negative model which corresponds to the vertebral column; and injecting a flowable solidifyable mass into the void spaces defined by said negative model, with said elongated flexible body and said elastomeric hull stretched thereover and letting said mass solidify into a final skeleton section.

10. The method of claim 8, comprising the steps of separating the skull section from the vertebral column section of said master model;

inserting an elongated flexible body into the molding section of said negative model corresponding to the vertebral column such that said elongated flexible body projects into the skull section thereof; and injecting a flowable solidifyable mass into the void spaces defined by said negative form, with said elongated flexible body and said elastomeric hull stretched thereover and letting said mass solidify to a final skeleton portion.

* * * * *